US012080144B2

(12) United States Patent
Ahmed et al.

(10) Patent No.: US 12,080,144 B2
(45) Date of Patent: Sep. 3, 2024

(54) LONG RANGE DEVICE FAILURE COMMUNICATION SYSTEM

(71) Applicant: GTI ENERGY, Des Plaines, IL (US)

(72) Inventors: Abdelallah Ahmed, Thousand Oaks, CA (US); Jeffrey A. Mays, Woodland Hills, CA (US); John C. Vega, III, Camarillo, CA (US); Shinjiro Miyata, Malibu, CA (US); David F. Morrison, II, Hesperia, CA (US)

(73) Assignee: GTI ENERGY, Des Plaines, IL (US)

( * ) Notice: Subject to any disclaimer, the term of this patent is extended or adjusted under 35 U.S.C. 154(b) by 0 days.

(21) Appl. No.: 17/899,775

(22) Filed: Aug. 31, 2022

(65) Prior Publication Data

US 2023/0060163 A1 Mar. 2, 2023

Related U.S. Application Data

(60) Provisional application No. 63/238,986, filed on Aug. 31, 2021.

(51) Int. Cl.
*G08B 21/18* (2006.01)

(52) U.S. Cl.
CPC .................................... *G08B 21/18* (2013.01)

(58) Field of Classification Search
CPC ...... G08B 21/18; G08B 21/182; G08B 23/00; G08B 21/16; G08B 26/00; G08B 27/001
See application file for complete search history.

(56) References Cited

U.S. PATENT DOCUMENTS

| | | | | | |
|---|---|---|---|---|---|
| 3,999,932 | A * | 12/1976 | Matthews | F23N 5/247 137/66 |
| 4,611,294 | A * | 9/1986 | Stanfill | G05D 11/132 700/285 |
| 5,030,033 | A * | 7/1991 | Heintzelman | B65D 88/76 405/129.5 |
| 8,564,237 | B2 * | 10/2013 | Bandaru | G01M 3/28 310/59 |
| 9,202,362 | B2 * | 12/2015 | Hyland | H04M 11/04 |
| 9,441,987 | B2 * | 9/2016 | Cornwall | F17D 5/02 |
| 9,618,418 | B2 * | 4/2017 | Zhang | G01M 3/2807 |
| 9,964,512 | B2 * | 5/2018 | Miyai | F04B 51/00 |
| 11,761,195 | B2 * | 9/2023 | Le Roux | B33Y 30/00 425/62 |
| 2002/0161866 | A1 * | 10/2002 | Tozer | H04L 67/02 709/223 |
| 2007/0069409 | A1 * | 3/2007 | Han | B29C 45/1734 425/584 |
| 2009/0081492 | A1 * | 3/2009 | Hasuka | H01M 8/04201 429/429 |

(Continued)

*Primary Examiner* — Steven Lim
*Assistant Examiner* — Son M Tang
(74) *Attorney, Agent, or Firm* — Pauley Erickson & Swanson

(57) ABSTRACT

A system and method for communicating operation failure of a remote pipeline pneumatic device. A flow detector is used in combination with the pipeline pneumatic device. A controller in combination with the flow detector and a long range communication transmitter communicates an alarm upon detecting a predetermined flow, such as outside an expected amount. The controller can initiate a flow timer upon the actuation of the pneumatic device, and transmit an alarm upon the flow timer exceeding a predetermined value representing the expected amount.

8 Claims, 1 Drawing Sheet

(56) References Cited

U.S. PATENT DOCUMENTS

| | | | | |
|---|---|---|---|---|
| 2009/0314369 | A1* | 12/2009 | Pozniak | F17D 5/02 137/861 |
| 2010/0330515 | A1* | 12/2010 | Ueki | F23N 5/242 340/632 |
| 2011/0060700 | A1* | 3/2011 | Durtschi | G16H 40/60 128/204.22 |
| 2011/0192465 | A1* | 8/2011 | Collings, III | F16K 37/005 137/554 |
| 2011/0205055 | A1* | 8/2011 | Smaidris | F16K 37/0091 340/539.1 |
| 2014/0118123 | A1* | 5/2014 | Lim | H04L 12/282 340/12.53 |
| 2014/0152468 | A1* | 6/2014 | Obenchain | A61M 16/20 340/870.09 |
| 2017/0044744 | A1* | 2/2017 | Everhart | G01M 3/2815 |
| 2017/0216641 | A1* | 8/2017 | Magnone | A62C 3/002 |
| 2017/0268954 | A1* | 9/2017 | Ocalan | H04W 84/18 |
| 2018/0028769 | A1* | 2/2018 | Obenchain | A61M 16/0051 |
| 2019/0066479 | A1* | 2/2019 | Wesley | G08B 21/16 |
| 2020/0286351 | A1* | 9/2020 | Corcoran | H04L 12/2825 |
| 2020/0380836 | A1* | 12/2020 | Harrison | G08B 21/14 |
| 2021/0123405 | A1* | 4/2021 | Faber | F02M 65/007 |
| 2021/0237224 | A1* | 8/2021 | Kobata | B24B 37/10 |
| 2021/0302199 | A1* | 9/2021 | Radgowski | G01D 4/004 |
| 2022/0106177 | A1* | 4/2022 | Tansey, Jr. | F17C 5/02 |
| 2022/0282835 | A1* | 9/2022 | McNicholas | F17C 13/02 |
| 2023/0167999 | A1* | 6/2023 | Ma | F24F 11/84 62/115 |

* cited by examiner

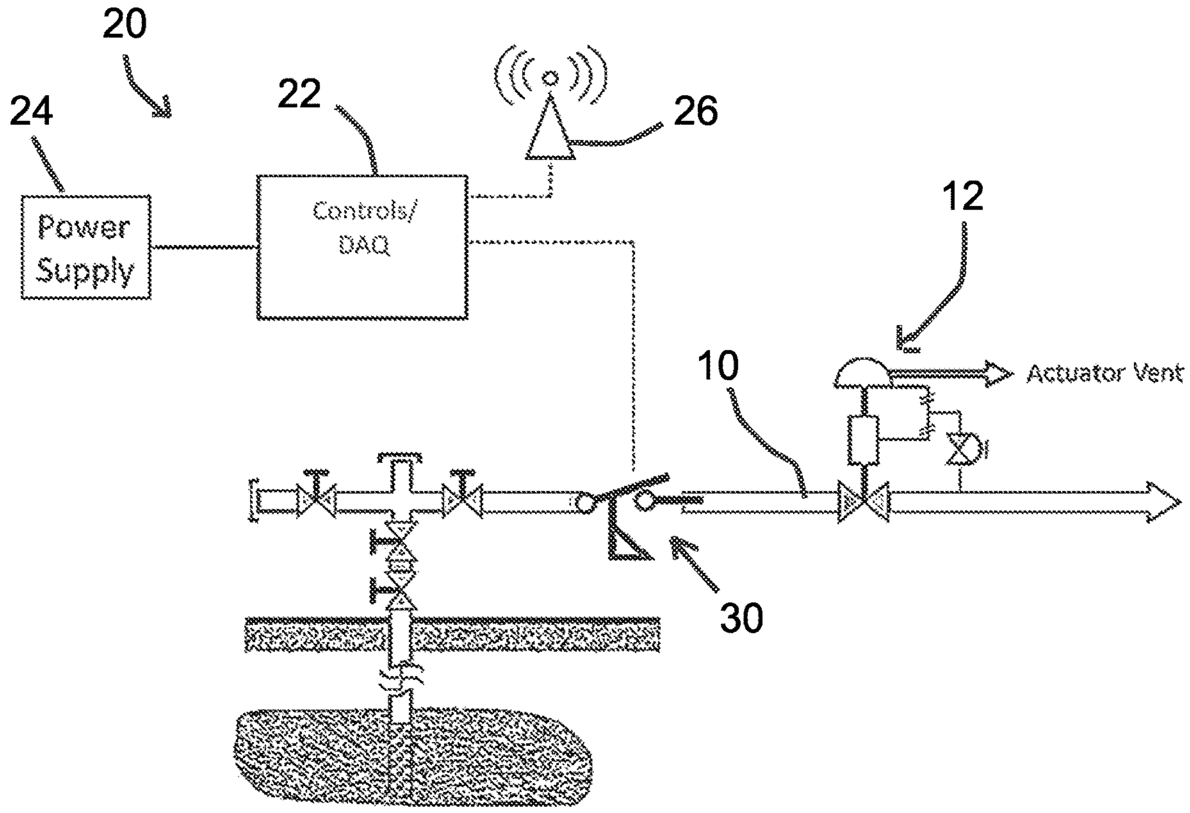
20
24
22
26
Power Supply
Controls/ DAQ
12
10
Actuator Vent
30

LONG RANGE DEVICE FAILURE COMMUNICATION SYSTEM

CROSS REFERENCE TO RELATED APPLICATION

This application claims the benefit of U.S. provisional patent application Ser. No. 63/238,986, filed on 31 Aug. 2021. The provisional application is hereby incorporated by reference herein in its entirety and is made a part hereof, including but not limited to those portions which specifically appear hereinafter.

GOVERNMENT SUPPORT CLAUSE

This invention was made with government support under Award No. DE-FE0029060 awarded by the Department of Energy. The government has certain rights in the invention.

BACKGROUND OF THE INVENTION

This invention relates generally to an apparatus and method for communicating operation failure over long distances, and more particularly to a failure detection and communication system and method for remote pneumatic valves, such as using low-power wide-area network modulation technique (e.g., LoRa® radio).

Pneumatic valves are used in remote natural gas wellheads. These pneumatics have a tendency to fail open and cumulatively emit up 30% of all natural gas emissions from the production segment. There is a need for improved monitoring for these remote devices.

SUMMARY OF THE INVENTION

The invention generally relates to a device and method for monitoring and communicating operation failure for remote natural gas production and/or transport components.

The invention includes a control device for monitoring a gas flow, such as to a remotely positioned, pneumatically operated device. A controller determines when the actuation flow to the pneumatic device does not stop after an expected time, indicating failure of the pneumatic device. The controller then initiates an alert transmission sent over a long distance to a receiver.

In embodiments of this invention, a flow detector, such as a flow switch or other sensor, is positioned in combination with the pneumatic device. In preferred embodiments, the flow detector is a flow switch positioned upstream of the pneumatic device, in the gas flow line for operating the pneumatic device.

Upon the flow detector determining an operational gas flow to the pneumatic device, the controller can initiate a timer. If the operational flow continues past a predetermined, expected time, the controller determines the pneumatic device has failed, due to unexpected gas use, and initiates an alarm.

In other embodiments, the controller and/or flow detector can be integrated with the pneumatic device. For example, the controller can be combined or communicate with a controller for the pneumatic device, such as to determine an intended, but not actuated, pneumatic shut-off event.

The controller includes or is in combination with a long range communication transmitter. In embodiments of this invention, the long range communication transmitter is a long range radio and/or cellular transmitter.

The invention includes a method for communicating pipeline operation failure. The method includes: detecting an actuation of a pneumatic device with a flow detector; detecting a gas flow to the pneumatic device above an expected value; and transmitting an alarm upon reaching the gas flow above the expected value.

The invention further includes a method for communicating operation failure, such as in a remote, unmanned pneumatic device. The method includes: detecting an actuation of a pneumatic device with a flow detector; initiating a flow timer upon the actuation of the pneumatic device; and transmitting an alarm upon the timer exceeding a predetermined value.

By adding a smart system technology to inform a producer of incidences and exact location of these failing valves, the producer can be more adept to resolve these failures in a more timely manner and mitigate these emissions. The nature of the invention is to look for a change in the system and communicate this change, thus it can be modulated to look for other disturbances in the pipeline (such as a broken pipe). This technology will allow the energy supply infrastructure to communicate to the producer and allow them to be more aware of disturbances in the delivery of the fluids.

Other objects and advantages will be apparent to those skilled in the art from the following detailed description taken in conjunction with the appended claims and drawings.

BRIEF DESCRIPTION OF THE DRAWING

The FIGURE shows a representative implementation of the system according to one embodiment of this invention.

DETAILED DESCRIPTION OF THE INVENTION

The present invention provides a system and method for monitoring and communicating operation failure for remote natural gas production and/or transport components. The FIGURE shows an exemplary system 20, including a controller 22 in combination with a natural gas line 10 with a pneumatic device 12. The controller 22 includes the necessary control circuitry, and optionally a data acquisition module (DAQ).

An electric power supply 24, such as a battery, solar panel, thermoelectric generators, or any external power supply, powers the controller 22. In embodiments of the invention, the power supply includes a small power generator (e.g., <1 W), such as a solar panel and/or TEG, with a battery storage. A larger battery alone can be used as well, but the external power generator is desirable to extend battery life.

The controller 22 includes a communication device, represented by antenna 26, for long range transmission of any detected failures. The communication can be by, for example, Long Range radio (LoRA) and/or a cellular device. A purpose of the device 20 is to determine whether there is a leak, such as pneumatic device 12 leaking, and to communicate to a remote user to inform him/her of the leak/failure of the pneumatic. The communication can cover a range of approximately 10 Km using just a LoRa, or globally using a combination of LoRa and cellular.

A flow detector, such as a flow switch 30, is placed in the gas flow upstream of the pneumatic device 12. As the device 12 is actuated, the flow switch 30 sends a signal to the controller 22. In embodiments of this invention, when natural gas passes through the flow switch 30 to operate the pneumatic device 12, an electrical circuit closes and is picked up by the controller 22. Once the controller 22 receives this signal, the controller 22 will initiate a timer, e.g., an analog timer. In the event that the timer exceeds a threshold value without the expected gas flow reduction, the controller 22 will send out an alert signal through the LoRA radio, cellular device, or LoRa to cellular device to a designated receiver and inform the user of the timeout of the device and the possible/likely leak or pneumatic failure. The alert signal desirably includes identification information (e.g., the well serial number, GPS coordinates, etc.) for the producer so that they can respond in fixing the leak.

The invention thus provides a relatively inexpensive (~$300) monitoring system that communicates a specific location of incidence, allowing for faster response. The apparatus and system of this invention can be implemented as an add-on for existing remote devices, or integrated with pneumatic devices, and/or the respective control systems, at manufacturing. The invention requires installation of switch valve into an existing pipeline, but generally is easily adapted to existing pneumatic pipeline device.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A system for communicating pipeline operation failure, comprising:

a flow detector;

a long range communication transmitter; and a controller in combination with the flow detector and the long range communication transmitter, wherein the controller communicates an alarm upon detecting a predetermined gas flow, and the controller includes a timer configured to time a pipeline flow monitored by the flow detector;

wherein the flow detector is disposed within the pipeline flow upstream of a pneumatic valve to detect actuation of the pneumatic valve, the timer is started upon the actuation of the pneumatic valve, and the alarm is transmitted upon the timer exceeding a predetermined value without a detected pipeline flow reduction to the pneumatic valve.

2. The system of claim 1, wherein the long range communication transmitter comprises a long range radio and/or cellular transmitter.

3. The system of claim 1, wherein the flow detector is a flow switch upstream of a pneumatic valve.

4. The system of claim 3, wherein the long range communication transmitter comprises a long range radio.

5. The system of claim 1, further comprising a pneumatic device configured to operate with a gas flow, and wherein the flow detector in combination with the pneumatic device.

6. The system of claim 5, wherein the flow detector is a flow switch controlling the gas flow and upstream of the pneumatic device.

7. A method for communicating pipeline operation failure, the method comprising:

detecting an actuation of a pneumatic valve with a flow detector disposed within a pipeline upstream of the pneumatic valve;

initiating a flow timer upon the actuation of the pneumatic valve, wherein the flow detector detects a flow of a gas to the pneumatic valve to initiate the flow timer;

detecting a gas flow to the pneumatic valve above an expected value; and transmitting an alarm upon reaching the gas flow above the expected value, wherein the alarm is transmitted upon the flow timer exceeding a predetermined value without a detected pipeline flow reduction to the pneumatic valve, and a controller is in combination with the flow detector and a long range communication transmitter, wherein the controller communicates the alarm through the long range communication transmitter.

8. The method of claim 7, wherein the long range communication transmitter comprises a long range radio and/or cellular transmitter.

* * * * *